United States Patent [19]

Kruk

[11] Patent Number: 5,135,236
[45] Date of Patent: Aug. 4, 1992

[54] SEAL FOR BEARING ASSEMBLY

[75] Inventor: Stanislaw Kruk, Vastra Frolunda, Sweden

[73] Assignee: SKF GmbH, Schweinfurt, Fed. Rep. of Germany

[21] Appl. No.: 684,450

[22] Filed: Apr. 11, 1991

Related U.S. Application Data

[63] Continuation of Ser. No. 322,078, Mar. 10, 1989, abandoned, which is a continuation of Ser. No. 57,620, Jun. 2, 1987, abandoned.

[30] Foreign Application Priority Data

Jun. 7, 1986 [DE] Fed. Rep. of Germany ....... 8615458

[51] Int. Cl.$^5$ .......................... F16J 15/32; F16C 33/78
[52] U.S. Cl. ...................................... 277/37; 277/153; 384/485; 384/486
[58] Field of Search ....................... 277/37-39, 277/47-50, 44, 45, 153; 384/477, 486, 148, 182, 484, 485

[56] References Cited

U.S. PATENT DOCUMENTS

| | | | |
|---|---|---|---|
| 2,873,153 | 2/1959 | Haynie | 384/484 |
| 3,011,814 | 12/1961 | Rhoads et al. | 277/37 |
| 3,022,081 | 2/1962 | Kosatka | 277/39 |
| 3,028,203 | 4/1962 | Lund et al. | 384/485 |
| 3,064,982 | 11/1962 | Stephens | 384/485 X |
| 3,275,333 | 9/1966 | Scott et al. | 277/39 |
| 3,561,770 | 2/1971 | Corsi et al. | 277/37 X |
| 3,856,368 | 12/1974 | Andersen | 384/485 |
| 4,015,883 | 4/1977 | Taylor | 277/153 X |
| 4,043,620 | 8/1977 | Otto | 384/485 |
| 4,285,526 | 8/1981 | Klinteberg et al. | 384/477 |

FOREIGN PATENT DOCUMENTS 703022  2/1965  Canada .................................. 277/37

Primary Examiner—Allan N. Shoap
Attorney, Agent, or Firm—Eugene E. Renz, Jr.

[57] ABSTRACT

A sealed mounting consisting of a bearing with an inner ring, and axle or shaft with a lateral surface corresponding essentially to the outside diameter of the inner ring, a seating surface stepped down from that lateral surface to correspond to the bore of the inner ring, and a seal located between the inner ring and the outer ring. The seal has an essentially cylindrical seating section of elastic material in the bore. This section is seated partially on the inner ring and partially on the lateral surface of the axle or shaft, and is provided with at least one sealing projection, which cooperates with the outer ring of the bearing or the like.

1 Claim, 1 Drawing Sheet

5,135,236

SEAL FOR BEARING ASSEMBLY

This is a continuation of copending application Ser. No. 07/377,078 filed on Mar. 10, 1989, now abandoned, which is a continuation of application Ser. No. 07/057,620 filed on Jun. 2, 1987, now abandoned.

BACKGROUND OF THE INVENTION

Seals for bearing assemblies are not new. A typical seal of the type to which the present invention relates is shown in West German Utility Patent No. 1,981,048. In the bearing mounting shown, the inner ring of the roller bearing is seated on an axle or shaft and a lateral surface of the ring rests against a flange surface which is continued to form the later la surface of the axle. In this known design, the lateral surface and the shoulder surface of the inner ring have generally the same diameter. The mounting assembly further includes a seal comprising a metallic support element which has a layer of elastomeric material on opposite sides. One layer is seated on the bore surface of the housing which also serves as a seating surface for the outer ring. The other layer is seated in a ring-shaped recess in the outer ring. The seal is provided with two projections in the form of sealing lips on the radial inboard side of the seal. One of the projections or sealing lips contacts the shoulder surface of the inner ring and the other sealing lip contacts the lateral surface of the axle. The space between the sealing lips defines an annular gap so that this known design provides a functioning seal for the bearing space. It has been observed, however, that when the bearing space is filled with a lubricant, the lubricant tends to leak and settle between the seating surfaces and escape at the lateral surface of the inner ring, particularly when the other side of the bearing is not sealed and thus, the outside area of the bearing cooperates at this point as a lubricant chamber. When the space between the sealing lips is filled, it is no longer possible to prevent such escape of lubricant.

SUMMARY OF THE INVENTION

With the forgoing in mind, it is an object of the present invention to provide a sealed mounting of the type described above wherein the bearing space is sealed and the escape of lubricant across the seating surfaces is prevented. To this end, and in accordance with the present invention, the seal, which engages in the bore, has a generally cylindrical seating section of elastic material and is seated by means of this seating section partially on the inner ring and partially on the lateral surface of the axle or shaft. The seating section is provided with at least one sealing lip which cooperates with the outer ring of the bearing or the like.

Thus, the seal of the present invention functions in a manner opposite to that of a conventional seal for the reason that the seal is held in place in the area of the inner ring and by reason of the generally cylindrical seating section, the area between the lateral surface of the inner ring and the flange surface of the axle is sealed off reliably. Furthermore, the seating section of the seal can be drawn over this area with pretension to provide a non-slip installation of the seal.

In accordance with another feature of the present invention, the seal is designed as a modular construction with a metal support element and a profiled sheet-metal member which serves as a contact surface for the sealing projection and which is inserted into a recess in the outer ring. The profiled sheet metal element in this design acts as an axial extension of the outer ring and, thus, forms the complementary part of the seal by projecting out over the inner ring.

BRIEF DESCRIPTION OF THE DRAWING

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
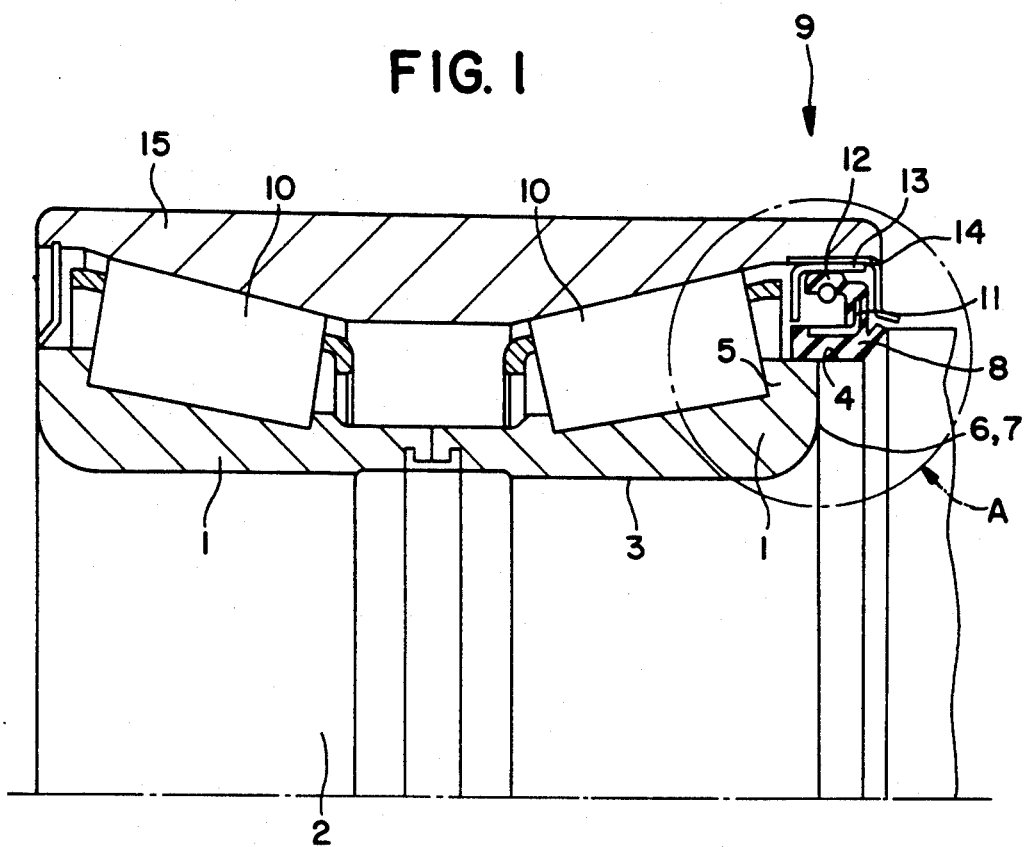
FIG. 1 is a transverse sectional view of a two-row conical roller bearing incorporating a mounting arrangement in accordance with the present invention.
Figure 2:
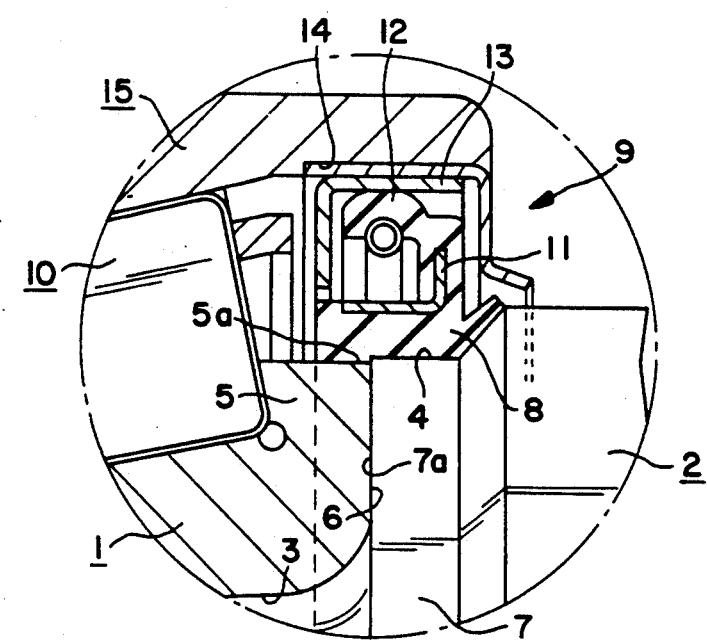
FIG. 2 is an enlarged fragmentary view of the portion circled in FIG. 1 at A.

Referring now to the figures, there is illustrated a two-row conical roller bearing comprising a split inner ring 1 adapted to be mounted on an axle 2 which has a diameter D slightly larger than that of a seating surface 3. The axle has an enlarged lateral surface which projects radially outwardly and has an outer diameter D1 of approximately the same diameter D2 as the shoulder 5 of the inner ring 1. The inner ring rest by way of its seating surface 6 against shoulder surface 7 between the seating surface 3 and lateral surface 4 of axle 2. The shoulder 7 has a lateral surface 7a extending transversely to the shoulder 7 which is contiguous to and aligned with the land surface 5a at one axial end of the inner ring. This area is covered by a seating section 8 made of an elastic material, such as rubber. The seating section 8 is a multi-component seal designed to prevent leakage from emerging radially from the bearing space between the rows of rollers 10 and out through the adjacent lateral surfaces of the inner ring halves and from there through unavoidable gaps at the seating surface 3 and along outer lateral surface 6 to the atmosphere. As illustrated, the elastic part of the seal 9 is vulcanized onto a metal support element 11 which continues as a sealing projection 12 and comes up against the inner surface of a profiled sheet metal element 13 consisting of two interengaging parts which are seated in a ring-shaped recess 14 in the outer ring 15. This configuration seals the inner space between the rolling elements.

Even though a particular embodiment of the present invention has been illustrated and described herein, it is not intended to limit the invention and charges and modifications may be made therein within the scope of the following claims.

What is claimed is:

1. The combination comprising a bearing having inner and outer rings (1, 15) spaced apart to define an annular space between the rings, a shaft member (2) mounted in the bore of said inner ring and having a circumferential surface (4) axially aligned with the axis of the shaft member contiguous to and substantially aligned with a circumferentially extending land surface at one axial end of said inner ring, an annular seal (9) located in a space defined by the inner and outer rings and said shaft member comprising an elastic sealing element having a generally cylindrical seating section (8) seated with a predetermined tension to overlie and sealingly engage said land surface of the inner ring and circumferential surface (4) of the shaft member, a flexible lip at one axial end of the seating section engaging an annular chamfered shoulder adjacent the circumferential surface (4), and a metallic support element (11) vulcanized to the elastic sealing element, and a profiled sheet metal element (13) consisting of two interengaging parts which are seated in a ring-shaped recess (14) in the outer ring (15), said elastic sealing element having at least one sealing projection (12) sealingly engaging the interior surface of said element (13) to provide a permanent and reliable seal of the annular space by solely engaging the element (13) and lateral surface of the shaft member within the axial confines of the outer ring.

* * * * *